United States Patent
Chembolu et al.

(10) Patent No.: US 12,008,054 B2
(45) Date of Patent: Jun. 11, 2024

(54) SYSTEMS AND METHODS FOR DETERMINING AND UTILIZING SEARCH TOKEN IMPORTANCE USING MACHINE LEARNING ARCHITECTURES

(71) Applicant: Walmart Apollo, LLC, Bentonville, AR (US)

(72) Inventors: Satya Chembolu, San Jose, CA (US); Tony Eilo Lee, Mountain View, CA (US); Ciya Liao, Fremont, CA (US); Kaushal Yagnik, Santa Clara, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 17/588,663

(22) Filed: Jan. 31, 2022

(65) Prior Publication Data

US 2023/0281257 A1  Sep. 7, 2023

(51) Int. Cl.
*G06F 16/953* (2019.01)
*G06N 5/022* (2023.01)

(52) U.S. Cl.
CPC .......... *G06F 16/953* (2019.01); *G06N 5/022* (2013.01)

(58) Field of Classification Search
CPC ............................... G06F 16/953; G06N 5/022
See application file for complete search history.

(56) References Cited

U.S. PATENT DOCUMENTS

| | | | | |
|---|---|---|---|---|
| 7,305,389 B2 * | 12/2007 | Zeng | ....................... | G06F 16/38 707/999.005 |
| 7,693,825 B2 * | 4/2010 | Wang | .................... | G06F 16/951 707/723 |
| 8,108,374 B2 * | 1/2012 | Zhang | .................... | G06Q 30/02 707/723 |
| 8,515,212 B1 * | 8/2013 | Bengio | ................ | G06V 10/763 707/E17.02 |
| 9,183,203 B1 * | 11/2015 | Tuchman | ............ | G06F 16/3347 |
| 10,248,967 B2 * | 4/2019 | Liu | ....................... | G06F 16/9535 |
| 10,255,355 B2 * | 4/2019 | Endert | ................... | G06F 16/358 |
| 10,354,182 B2 * | 7/2019 | Chang | .................... | G06F 16/951 |
| 10,489,448 B2 * | 11/2019 | Kong | ................... | G06F 16/9538 |
| 11,610,588 B1 * | 3/2023 | Grichnik | ............... | H04L 67/306 |
| 11,790,911 B2 * | 10/2023 | Fainberg | .................. | G10L 15/16 704/232 |
| 2005/0234953 A1 * | 10/2005 | Zhang | .................. | G06F 16/3334 |
| 2007/0255755 A1 * | 11/2007 | Zhang | ..................... | G06F 16/78 |

(Continued)

FOREIGN PATENT DOCUMENTS

CN 111984749 11/2020

*Primary Examiner* — Mark E Hershley
(74) *Attorney, Agent, or Firm* — BRYAN CAVE LEIGHTON PAISNER LLP

(57) ABSTRACT

Systems and methods including one or more processors and one or more non-transitory storage devices storing computing instructions configured to run on the one or more processors and execute functions comprising: receiving, at a search engine, a search query comprising tokens; determining, using a weight determination model, token weights for the tokens included in the search query; comparing the token weights associated with the tokens to a probability threshold; identifying the tokens that satisfy the probability threshold; and utilizing the tokens that satisfy the probability threshold to identify the search results. Other embodiments are disclosed herein.

20 Claims, 6 Drawing Sheets

(56) References Cited

U.S. PATENT DOCUMENTS

| | | | |
|---|---|---|---|
| 2007/0276829 A1* | 11/2007 | Wang | G06F 16/3334 |
| 2009/0157720 A1* | 6/2009 | Kolcz | G06Q 10/10 707/999.102 |
| 2011/0131157 A1* | 6/2011 | Iyer | G06Q 30/0251 707/706 |
| 2011/0131205 A1* | 6/2011 | Iyer | G06F 16/3334 707/E17.064 |
| 2013/0204866 A1* | 8/2013 | Fork | G06F 16/532 707/723 |
| 2015/0318015 A1* | 11/2015 | Bose | G08B 21/043 386/248 |
| 2016/0055202 A1* | 2/2016 | Rosenburg | G06F 16/24578 707/768 |
| 2016/0292248 A1* | 10/2016 | Garcia | G06Q 10/063 |
| 2017/0213127 A1* | 7/2017 | Duncan | G16B 50/30 |
| 2017/0236073 A1* | 8/2017 | Borisyuk | G06Q 50/01 706/12 |
| 2018/0018564 A1* | 1/2018 | Erenrich | G06F 16/3334 |
| 2018/0276304 A1* | 9/2018 | Peled | G06F 16/958 |
| 2019/0066185 A1* | 2/2019 | More | G06N 7/01 |
| 2019/0113927 A1* | 4/2019 | England | G06F 16/285 |
| 2019/0370605 A1* | 12/2019 | Xie | G06F 18/2148 |
| 2020/0012930 A1* | 1/2020 | Kumar | G06F 16/3344 |
| 2020/0125575 A1* | 4/2020 | Ghoshal | G06F 3/0484 |
| 2020/0184278 A1* | 6/2020 | Zadeh | G06N 3/044 |
| 2020/0249918 A1* | 8/2020 | Svyatkovskiy | G06N 3/084 |
| 2021/0042830 A1* | 2/2021 | Burke | G06Q 20/341 |
| 2021/0056114 A1* | 2/2021 | Price | G06F 16/24578 |
| 2021/0191925 A1* | 6/2021 | Sianez | G06N 20/00 |
| 2021/0201044 A1* | 7/2021 | Herdade | G06T 11/20 |
| 2021/0240742 A1* | 8/2021 | Wang | G06F 16/355 |
| 2021/0241313 A1* | 8/2021 | Wang | G06F 16/90344 |
| 2021/0286831 A1* | 9/2021 | Girardi | G06N 20/20 |
| 2021/0366065 A1* | 11/2021 | Zhou | G06F 16/338 |
| 2022/0012268 A1* | 1/2022 | Ghoshal | G06F 16/285 |
| 2022/0121884 A1* | 4/2022 | Zadeh | G06V 10/764 |
| 2022/0130493 A1* | 4/2022 | Turner | G16C 20/90 |
| 2022/0148699 A1* | 5/2022 | Kogan | G16H 10/20 |
| 2022/0179892 A1* | 6/2022 | Kermode | G06N 3/08 |
| 2022/0188700 A1* | 6/2022 | Khavronin | G06Q 30/0201 |
| 2022/0222260 A1* | 7/2022 | Lin | G06F 16/248 |
| 2022/0237368 A1* | 7/2022 | Tran | G06N 20/00 |
| 2022/0277032 A1* | 9/2022 | Mohamed | G06F 16/3326 |
| 2022/0318296 A1* | 10/2022 | Vang | G06F 16/5854 |
| 2023/0087738 A1* | 3/2023 | Samala | G06F 16/958 707/730 |

\* cited by examiner

300

- 401– Storage Module(s)
  - 330– Electronic Platform
    - 410– Database(s)
      - 310– Items
        - 415– Metadata
      - 390– Historical Search Data
    - 350– Machine Learning Architecture
      - 360– Weight Determination Model
        - 370– Token Weights
        - 445– Training Dataset
          - 446– Training Samples
            - 447– Labels
        - 440– Training Procedure
        - 461– Language Processing Model(s)
        - 462– Sequence Model(s)
        - 463– Classification Layer(s)
        - 464– Probability Threshold
        - 465– Maximum Token Threshold
    - 320– Search Engine
      - 325– Search Queries
        - 326– Tokens
      - 380– Search Results
        - 381– Recall Set
        - 382– Positively Engaged Items
        - 383– Negatively Engaged Items
- 402– Processing Module(s)

610– Receiving a search query comprising tokens at a search engine

620– Determining token weights for the tokens included in the search query using a weight determination model 630– Comparing the token weights associated with the tokens to a probability threshold 640– Identifying the tokens that satisfy the probability threshold 650– Utilizing the tokens that satisfy the probability threshold to identify the search results

FIG. 6

SYSTEMS AND METHODS FOR DETERMINING AND UTILIZING SEARCH TOKEN IMPORTANCE USING MACHINE LEARNING ARCHITECTURES

TECHNICAL FIELD

This disclosure relates generally to machine learning techniques that provide improved search results based, at least in part, on the importance of tokens included in search queries.

BACKGROUND

Many electronic platforms provide search engines that enable users to search for items included in an online catalog. Users can submit search queries to the search engines to search for items. However, in many cases, the search queries submitted by the users include unimportant or extraneous tokens. In these scenarios, the search engines cannot segregate the tokens that are important from the tokens that are unimportant or extraneous. Rather, the search engines tend to treat all tokens equally in identifying the search results. This can lead to suboptimal search results, which often include irrelevant items and which exclude certain relevant items.

BRIEF DESCRIPTION OF THE DRAWINGS

To facilitate further description of the embodiments, the following drawings are provided in which:

FIG. 4 illustrates a representative block diagram of a portion of the system of FIG. 3, according to an embodiment;

FIG. 6 illustrates a flowchart for a method, according to an embodiment.

Figure 1:
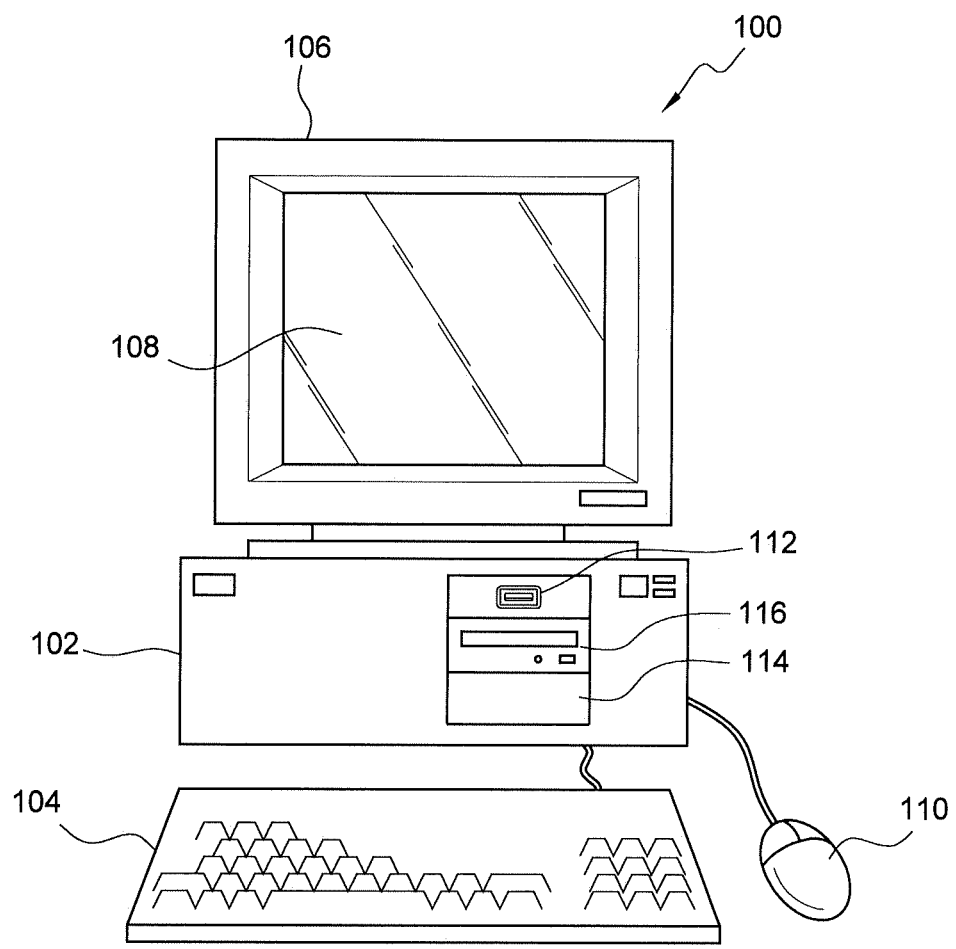
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and execute functions comprising: receiving, at a search engine, a search query comprising tokens; determining, using a weight determination model, token weights for the tokens included in the search query, wherein each token weight predicts a probability that a corresponding token will match metadata of a positively engaged item included in search results that are presented in response to the search query; comparing the token weights associated with the tokens to a probability threshold; identifying the tokens that satisfy the probability threshold; and utilizing the tokens that satisfy the probability threshold to identify the search results.

Various embodiments include a method. The method can be implemented via execution of computing instructions configured to run at one or more processors and configured to be stored at non-transitory computer-readable media The method can comprise: receiving, at a search engine, a search query comprising tokens; determining, using a weight determination model, token weights for the tokens included in the search query, wherein each token weight predicts a probability that a corresponding token will match metadata of a positively engaged item included in search results that are presented in response to the search query; comparing the token weights associated with the tokens to a probability threshold; identifying the tokens that satisfy the probability threshold; and utilizing the tokens that satisfy the probability threshold to identify the search results.

Figure 2:
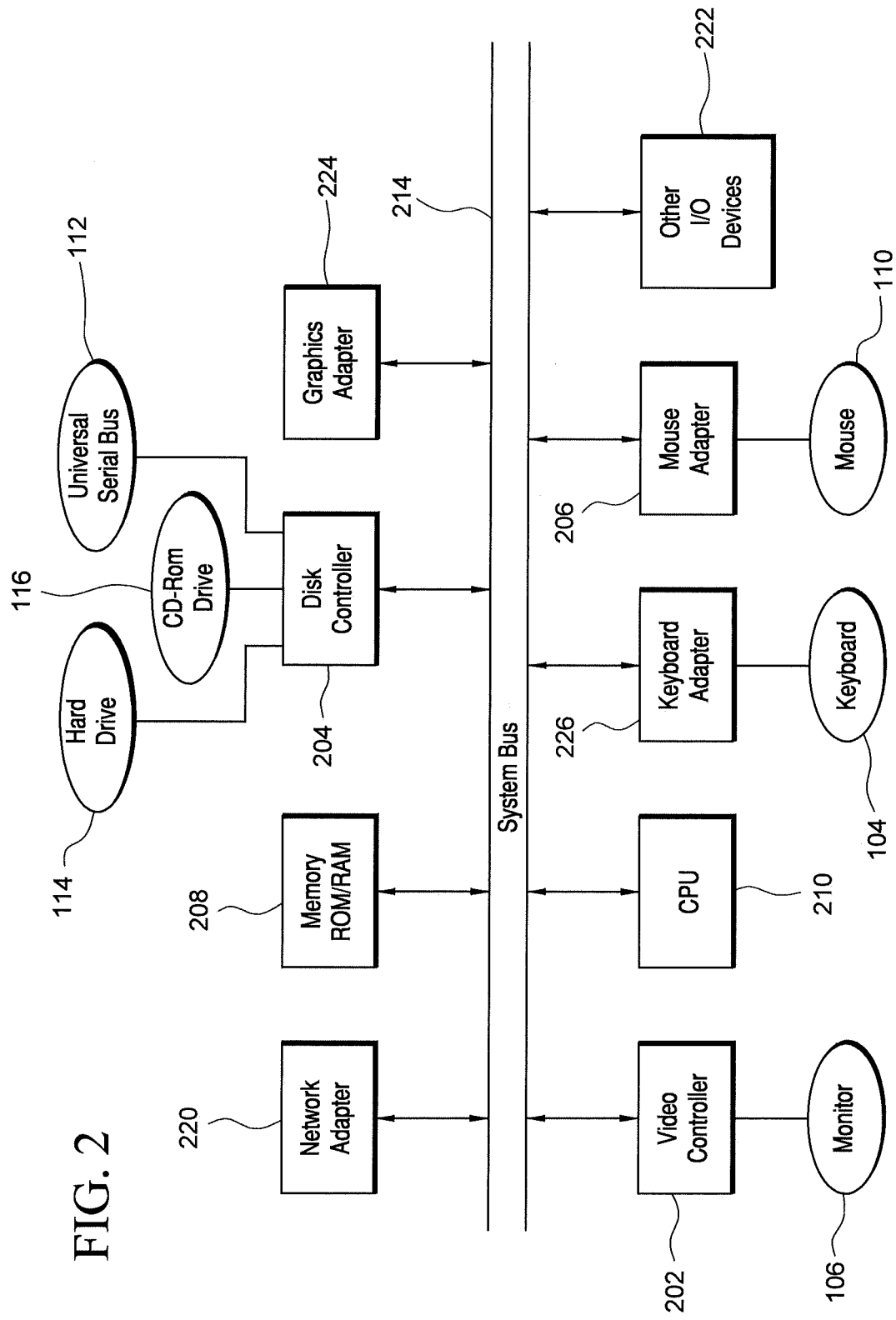
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc.

In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
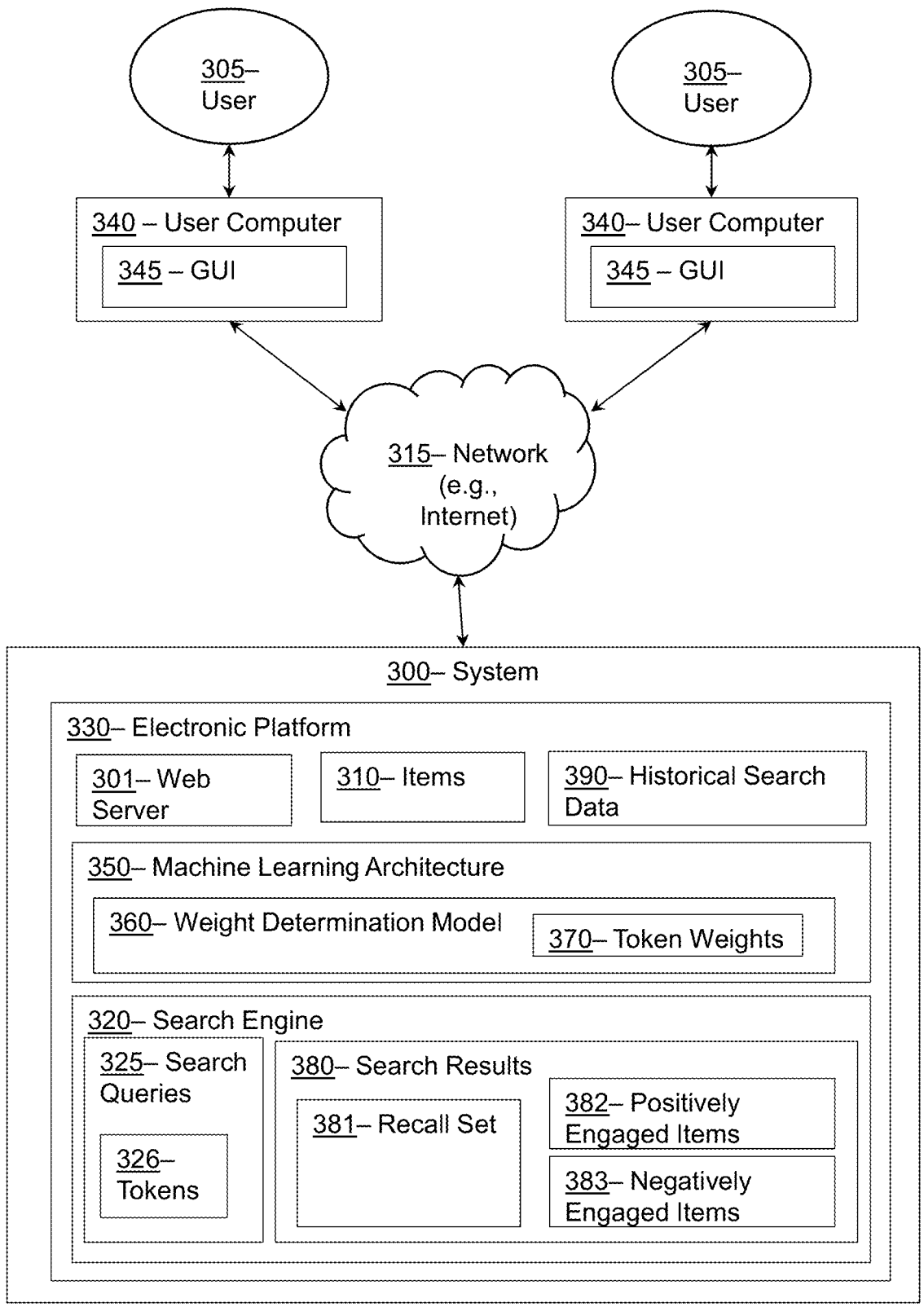
FIG. 3 illustrates a representative block diagram of a system, according to an embodiment.

Turning ahead in the drawings, FIG. 3 illustrates a block diagram of a system 300 that can be employed for improving recall and precision of search results, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 301, a search engine 320, an electronic platform 330, a machine learning architecture 350, and a weight determination model 360. Web server 301, search engine 320, electronic platform 330, machine learning architecture 350, and/or weight determination model 360 can each be a computer system, such as computer system 100 (FIG. 1), as described above, and can each be a single computer, a single server, or a cluster or collection of computers or servers, or a cloud of computers or servers. In another embodiment, a single computer system can host each of two or more of web server 301, search engine 320, electronic platform 330, machine learning architecture 350, and/or weight determination model 360. Additional details regarding web server 301, search engine 320, electronic platform 330, machine learning architecture 350, and weight determination model 360 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or one or more server computers (e.g., one or more server computers that host the electronic platform 330). In the same or different embodiments, GUI 345 can comprise a website accessed through network 315 (e.g., the Internet). In some embodiments, GUI 345 can comprise an eCommerce website. In the same or different embodiments, GUI 345 can be displayed as or on a virtual reality (VR) and/or augmented reality (AR) system or display.

In some embodiments, web server 301 can be in data communication through network 315 (e.g., the Internet) with user computers (e.g., 340). In certain embodiments, the network 315 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Web server 301 can host one or more websites. For example, web server 301 can host an eCommerce website that allows users to browse and/or search for products, to add products to an electronic shopping cart, and/or to purchase products, in addition to other suitable activities.

In many embodiments, web server 301, search engine 320, electronic platform 330, machine learning architecture 350, and/or weight determination model 360 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of the web server 301, search engine 320, electronic platform 330, machine learning architecture 350, and/or weight determination model 360 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 301, search engine 320, electronic platform 330, machine learning architecture 350, and/or weight determination model 360. In a similar manner, the processing module(s) and the memory storage module(s) can be local and/or remote to each other.

In many embodiments, web server 301, search engine 320, electronic platform 330, machine learning architecture 350, and/or weight determination model 360 can be configured to communicate with one or more user computers 340. In some embodiments, user computers 340 also can be referred to as customer computers. In some embodiments, web server 301, search engine 320, electronic platform 330, machine learning architecture 350, and/or weight determination model 360 can communicate or interface (e.g., interact) with one or more customer computers (such as user computers 340) through a network 315 (e.g., the Internet). Network 315 can be an intranet that is not open to the public. Accordingly, in many embodiments, web server 301, search engine 320, electronic platform 330, machine learning architecture 350, and/or weight determination model 360 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 301, search engine 320, electronic platform 330, machine learning architecture 350, and/or weight determination model 360 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 301, search engine 320, electronic platform 330, machine learning architecture 350, and/or weight determination model 360, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In certain embodiments, users 305 may operate user computers 340 to browse, view, purchase, and/or order items 310 via the electronic platform 330. For example, the electronic platform 330 may include an eCommerce website that enables users 305 to add items 310 to a digital shopping cart and to purchase the added items 310. The items 310 made available via the electronic platform 330 may generally relate to any type of product and/or service including, but not limited to, products and/or services associated with groceries, household products, entertainment, furniture, apparel, kitchenware, electronics, fashion, appliances, sporting goods, etc.

Electronic platform 330 can include a search engine 320 that assists users 305 with identifying items 310. The search engine 320 may generally represent any application, program, and/or feature that is configured to search for items 310 included in database and/or online catalog. Users can be presented with GUIs 345 that enable the users to submit search queries 325 to the search engine 320. Each of the search results 380 can correspond to an item 310 included in an online catalog associated with the electronic platform. Users 305 can utilize GUIs 345 to view the search results 380, select items 310 included in the search results 380 and, if desired, to add the items 310 to a digital shopping cart and/or initiate purchasing of the items 310.

The search results 380 can include both positively engaged items 382 and negatively engaged items 383. A positively engaged item 382 can represent an item 310 in a set of search results 380 that was engaged by a user 305 who submitted a search query 325. For example, a positively engaged item 382 can include an item 310 that was selected, viewed, ordered, purchased, and/or added to a digital shopping cart. A negatively engaged item 383 can represent an item 310 in the search results 380 that was not engaged by the user 305 (e.g., an item 310 that was not selected, viewed, ordered, purchased, and/or added to a digital shopping cart).

Each search query 325 submitted to the search engine 320 can include one or more tokens 326. In many cases, the search queries 325 can represent strings (e.g., comprising text and/or numbers), and each token 326 may generally represent a word or alphanumeric sequence included in the search query 325. In some cases, each token may represent a word or alphanumeric sequence that is separated or delimited by one or more spaces. For example, a search query 325 submitted to the search engine 320 can include a string comprising "large black couch". In this example, the search query includes three separate tokens 326 (token 1="large"; token 2="black"; and token 3="couch").

Upon receiving a search query 325, the search engine 320 can utilize the search query 325 to identify relevant search results 380. The search engine 320 can identify search results 380, at least in part, by matching the tokens 326 included in the search queries 325 to metadata associated with items 310 in an online catalog (e.g., the names, titles, and/or keywords associated with items).

In certain embodiments, the search engine 320 can include a backend component that initially retrieves a recall set 381 of search results 380. The recall set 381 of search results 380 may include a broad, relevant set of search results 380 pertaining to the items 310. In many embodiments, the focus of this component is on rapidly identifying a large collection of potentially relevant items 310 in real-time. Because there can be thousands or millions of items 310 offered on an electronic platform 330, the process of identifying the recall set 381 of search results 380 is preferably lightweight and performed with low-latency. A ranking component of the search engine 320 can then be configured to sort, order, and/or rank the recall set 381 of search results 380 (e.g., indicating which items to appear first and which items to appear last) before presentation of the search results 380 to the user 305.

In many traditional search engines, the most relevant search results 380 are not always presented to users 305. In many scenarios, suboptimal search results are presented to users because the search queries 325 submitted by the users 305 include tokens 326 that are unimportant or extraneous. In these scenarios, the search engines 320 are unable to segregate the tokens 326 that are important from the tokens 326 that are unimportant or extraneous. Rather, traditional search engines tend to treat all tokens 326 equally in identifying the search results. However, identifying search results 380 using unimportant or extraneous tokens 326 can lead to low quality search results that include irrelevant items 310 and that exclude certain relevant items 310.

The aforementioned problems can be particularly troublesome in scenarios where the search engines 320 are attempting to identify a recall set 381 of search results 380. As mentioned above, an aim of this first-stage retrieval can involve identifying a broad set of relevant search results 380. By treating all tokens 326 equally in a given search query 325, the recall set 381 can be infected with irrelevant items 310, which can negatively impact downstream operations associated with selecting and ranking the search results 380 to present to users 305.

To address these and other concerns, the electronic platform 330 includes a machine learning architecture 350 that is configured to execute various functions for analyzing tokens 326 in a search query 326 and predicting the importance of the tokens 326. Amongst other things, the machine learning architecture 350 can be configured to identify unimportant or extraneous tokens 326 that should not be utilized to identify search results 380.

In many cases, the machine learning architecture 350 can be trained to generate or assign a token weight 370 to each token 326 included in a search query 325. The token weights 370 can indicate or predict the importance of the tokens 326. For example, in certain embodiments, each token weight 370 can indicate or predict a probability that a corresponding token 326 will match metadata associated with of a positively engaged item 382 included in search results 380 that will be presented in response to a given search query 325. Any unimportant or extraneous tokens 326 can be removed from the search query 325 (or otherwise not utilized to identify search results 380). Exemplary techniques for performing these and other functions are described in further detail below.

The configuration of the machine learning architecture 350 can vary. The machine learning architecture 350 can include one or more machine learning models, deep learning models, and/or artificial neural network models that are configured to execute deep learning functions, artificial intelligence (AI) functions, machine learning functions and/or other functions to provide the functionality described herein.

In certain embodiments, the machine learning architecture 350 comprises a weight determination model 360, which can be configured to generate or determine the token weights 370 for tokens 326 in search queries 325. In some cases, the weight determination model 360 can be trained using historical search data 390. The historical search data 390 can include, inter alia, various information associated with search queries 325 that were previously submitted to the search engine 320 and users' engagement with items 310 presented in search results 380. The historical search data 390 can enable the weight determination model 360 to contextually learn token importance and assign corresponding token weights 370.

After the weight determination model 360 is trained, it may be deployed and/or incorporated into the electronic platform 330 to enhance generation of search results 380 by the search engine 320. During run time, search engine 320 can receive search queries 325 submitted by users 305 and leverage the weight determination model 360 to identify unimportant tokens 326 in the search queries 325. For example, in response to receiving a search query 380, the search engine 320 may initially utilize the weight determination model 360 to identify one or more unimportant or extraneous tokens 326 in the search query 380 based on the token weights 370 determined for each of the tokens 326. The search engine 320 can then eliminate the unimportant or extraneous tokens 326 from the search query 326, or otherwise avoid using the unimportant or extraneous tokens 326 in searches. On the other hand, the tokens 326 determined to be important or useful can be used to identify search results 380 with high precision and relevancy. The search results 380 can then be presented on a GUI 345 to the user 305.

Exemplary configurations for the machine learning architecture 350 and weight determination model 360 are described in further detail below, along with exemplary training procedures that can be applied to the machine learning architecture 350 and/or weight determination model 360.

Configuring a search engine 320 to assess the importance of query tokens can provide various advantages. One advantage is that the precision and relevancy of the search results 380 presented to users is greater in comparison to other techniques (e.g., such as techniques that treat all tokens equally). Another advantage is that users save time and effort with respect to identifying desired items 310 in the search results 380 because the irrelevant items 310 are removed from the search results 380. Moreover, users are not required to excessively scroll through the search results, or navigate through several interfaces to identify the most relevant or desired items 310. Other advantages include improved user experiences, greater customer retention, and higher conversion rates.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing an electronic platform 330, machine learning architecture 350 (and associated sub-components), and search engine 320. The one or more processing modules 402 can be configured to execute any and all instructions associated with implementing the functions performed by these components. Exemplary configurations for each of these components are described in further detail below.

The exemplary electronic platform 330 of system 300 includes one or more databases 410. The one or more databases 410 store data and information related to items 310 (e.g., products and/or services) that are offered or made available via the electronic platform 330. For example, for each item 310, metadata 415 associated with the item 310 can include any or all of the following: a name or title associated with the item, an item category (or categories) associated with the item, a price, one or more customer ratings for the item, an item description, images corresponding to the item, and various other data associated with the item 310. In many cases, the search engine 320 can identify search results 380, at least in part, by matching tokens 326 in a search query 325 to the names, titles, item descriptions, and/or other metadata 415 associated with items 310.

The one or more databases 410 also may store historical search data 390. The historical search data 390 can generally include any data associated with previous search queries 325 submitted by users 305. For example, in some cases, the historical search data 390 can indicate search queries 325 that were submitted, the users 305 that submitted the search queries 325, and the search results 380 that were presented in response to the search queries 325. The historical search data 390 also can store engagement information indicating whether the items 310 included in the search results 380 were engaged by users e.g., clicked on, selected, viewed, ordered, purchased, and/or added to a digital shopping cart). For example, the historical search data 390 can store information identifying positively engaged items 382 included in search results 380 for each search query 325, and negatively engaged items 383 included in the search results for each search query 325. The historical search data 390 also can include other information and data related to search queries 325. Each time a search query 325 is received by the search engine 320, the historical search data 390 can be supplemented with additional information.

As mentioned above, the search engine 320 can improve the recall and precision of search results 380 (including, but not limited to, search results 380 included in recall sets 381) by leveraging token weights 370 generated by the weight determination model 360 to eliminate unimportant or extraneous tokens 326 included in search queries 325. The manner in which the weight determination model 360 determines the token weights 370 can vary.

Figure 5:
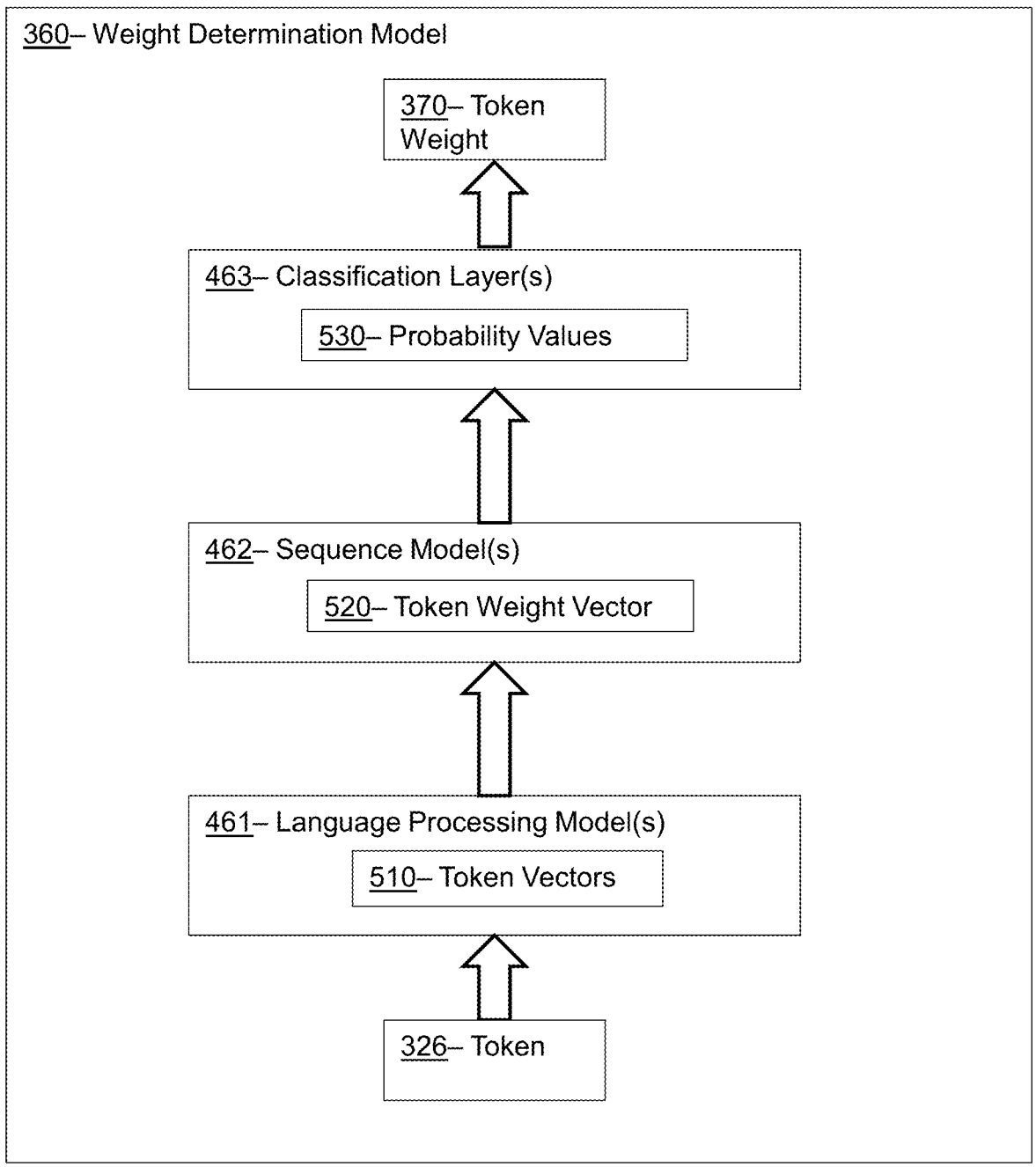
FIG. 5 illustrates a representative block diagram illustrating an exemplary architecture for a weight determination model, according to an embodiment.

FIG. 5 illustrates an exemplary architecture 500 for a weight determination model 360 according to certain embodiments. In this example, the weight determination model 360 includes a language processing model 461, a sequence model 462, and a classification layer 463 that are configured to analyze and/or process tokens 326 to generate the token weights 370.

The language processing model 461 can represent a neural network model that is trained to learn word or linguistic associations, and map tokens 326 to corresponding vectors or embeddings. In some cases, the language process model 461 can be implemented using a version of the Word2Vec model. Other types of learning models (e.g., such as Char2Vec models) also may be utilized to perform the functionality of the language processing model 461.

Upon receiving a search query 320 at a search engine 320, the language processing model 461 may initially generate a corresponding token vector 510 for each token 326 included in the search query. The token vectors 510 may represent word embeddings that correspond to the tokens 326.

The sequence model 462 may represent a deep learning model that is trained to learn token importance over a sequence of data. In some cases, a Bi-LS™ (bi-directional long-short term memory) model may be utilized as the sequence model 462 in the weight determination model 360. Other types of learning models (e.g., such as BERT models or bi-directional encoder representations from transformers models) also may be utilized to perform the functionality of the sequence model 462.

The sequence model 462 can receive the token vectors 326 from the language processing model 461, and generate token vectors 326 based on the token weight vectors 520. As explained in further detail below, the sequence model 462 can be trained using historical search data 390 that is supplemented with labels to learn whether a token 326 is important or unimportant in the context of a given search query. Thus, upon receiving a token vector 326 corresponding to a token 326, the sequence model 462 can map the token vector 510 to a token weight vector 520, which can represent the importance of the corresponding token 326.

In certain embodiments, the classification layer 463 may represent a linear feedforward neural network layer with sigmoid activation function that determines the values for the token weights 326. The classification layer 463 can receive the token weight vectors 520 from the sequence model 362, and map the token weight vectors 520 to probability values 530 within a predetermined range. These probability values 530 can be used to represent the token weights 370 of the tokens 326. In some cases, each token weight 370 may represent a value between zero and one, and the classification layer 463 maps the token weight vector 520 to a probability value 530 within this range.

In certain embodiments, each token weight 370 determined by the weight determination model 360 can generally represent a probability that a corresponding token will match a positively engaged item 382 (FIGS. 3 and 4) included in search results that are presented in response to a given search query 325. As mentioned above, a positively engaged item 382 (FIGS. 3 and 4) can represent an item 310 presented in search results 380 that is engaged by a user (e.g., selected, added to a digital shopping, ordered, and/or purchased). Thus, each token weight 370 may predict a probability that a corresponding token 326 will match metadata 415 (FIG. 4) associated with a positively engaged item 382 (FIGS. 3 and 4).

Returning to FIG. 4, the token weights 370 assigned to tokens 326 of a search query 325 may be utilized to exclude one or more tokens 326 that are determined to be unimportant or extraneous (e.g., because there is a low probability that those tokens 326 will match a positively engaged item 382). In certain embodiments, each of the token weights 370 may be compared to a probability threshold 464 to determine whether or not to exclude a corresponding token 326. Any appropriate probability threshold 464 may be utilized. In certain embodiments, the probability threshold 464 can be set to 0.4.

For a given search query 325, each token 326 that includes a token weight 370 having a value equal to or below the probability threshold 464 may be excluded from the search query 325 and/or not utilized to identify search results 380. Conversely, each token 326 that includes a token weight 370 having a value greater than the probability threshold 464 may be utilized to identify search results 380. In this manner, only tokens 326 that have a sufficient probability of matching with a positively engaged item 382 are utilized to identify search results 380, which serves to increase both the precision and recall of the search results 380.

In certain scenarios, it can be important to decrease the latency associated with identifying search results 380. This is especially true in scenarios in which a search engine 320 is identifying a recall set 381 of search results 380 that involves executing matching operations across thousands or millions of items 310. The latency associated with these matching operations can be greatly increased if a search query 325 includes a large number of tokens 326, and the search engine 320 is required to perform matching operations on all of the tokens.

Advantageously, the techniques described herein can help reduce the latency of the search engine 320 by eliminating matching operations on unimportant tokens 326. However, in some scenarios, there still may exist a relatively large number of tokens 326 in a given search query 325 that satisfy the probability threshold 464. In such scenarios, a maximum token threshold 465 may be utilized to limit the number of tokens 326 that are utilized to identify search results 380.

Any appropriate maximum token threshold 465 may be utilized. In certain embodiments, the maximum token threshold 465 can be set to seven. If a total number of tokens in a given search query 325 (which satisfy the probability threshold 464) exceed the maximum token threshold 465 (e.g., seven), then the tokens 326 having the highest token weights 370 can be selected to be used in identifying search results 380. In this manner, the maximum token threshold 465 reduces the latency of the search engine 320 while still utilizing the tokens 326 having the greatest probability of matching with a positively engaged item 382.

Moving on, a training procedure 440 may be executed to train the weight determination model 360 and/or sequence model 462 of the machine learning architecture 350 to accurately determine token weights 370 for tokens 326 of a search query 325. Initially, the training procedure 440 may generate a training dataset 445 that includes a plurality of training samples 446. Various training procedures 440 and training datasets 445 can be utilized to train the weight determination model 360 and/or sequence model 462 of the machine learning architecture 350.

In certain embodiments, the historical search data 390 can be utilized to generate the training samples 446. For example, one exemplary technique for generating the training samples 446 can initially include analyzing the historical search data 390 to identify items 310 that have been positively engaged a predetermined number of times (e.g., three times) by users in the past. For each of the identified items 310, the search queries 325 that caused the item 310 to be appear in search results 380 are identified and stored with the training samples 446. Thereafter, for each identified search query 325, a label 447 is assigned to each token 326 included in the search query 325. The label 447 may represent a binary value (e.g., 0 or 1) indicating whether a corresponding token 326 matched the metadata 415 of a corresponding positively engaged item 382. The labels 447 may be stored with the training samples 446. After the training dataset 445 is derived from the historical search data 390, the training samples 446 can be utilized to train the sequence model 462.

The aforementioned training procedure 440 enables the sequence model 462 to understand the importance of the tokens 326 included in search queries 325. Because each token 326 is separately labeled to identify whether or not it resulted in a match with a metadata 415 of a positively engaged item 382, the sequence model 462 can be trained to understand the tokens 326 that are likely to produce search results 180 that correspond to positively engaged items 382.

Additionally, training the sequence model 462 with the separately labeled tokens 326 enables it to understand the importance of the tokens 326 in the context of a particular search query 325. To illustrated by way of example, consider two separate search queries 325 ("blinds by size" and "travel size toothpaste") that each include a token 326 that comprises the term "size." In the first query ("blinds by size"), the term "size" may be unimportant or extraneous because it does not assist with matching to metadata 415 of items 315. Conversely, the usage of the term "size" in the second query ("travel size toothpaste") can be useful for matching. Because labels 447 are applied on a per token basis in the training samples 446, the sequence model 462 can be trained to understand when the token "size" is important and unimportant for search queries 325 having varying contexts, and can assign appropriate token weights 370 based on the context in which the token is used. Thus, the same token 326 (e.g., "size") can be assigned different token weights 370 based on the context in which it is used (e.g., based on the other tokens 326 that are included in the search queries 325 and/or based on the types of items 310 that have been engaged).

FIG. 6 illustrates a flow chart for an exemplary method 600, according to certain embodiments. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 300 (FIGS. 3-4), electronic platform 330 (FIG. 3-4), search engine 320 (FIGS. 3-4), and/or machine learning architecture 350 (FIGS. 3-4) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. Such non-transitory memory storage modules can be part of a computer system such as system 300 (FIGS. 3-4), electronic platform 330 (FIG. 3-4), search engine 320 (FIGS. 3-4), and/or machine learning architecture 350 (FIGS. 3-4). The processing module(s) can be similar or identical to the processing module(s) described above with respect to computer system 100 (FIG. 1) and/or system 300 (FIGS. 3 and 4).

Method 600 can comprise an activity 610 of receiving a search query comprising tokens at a search engine.

Method 600 can further comprise an activity 620 of determining token weights for the tokens included in the search query using a weight determination model. In certain embodiments, each token weight predicts a probability that a corresponding token will match metadata of a positively engaged item included in search results that will be presented in response to the search query.

Method 600 can further comprise an activity 630 of comparing the token weights associated with the tokens to a probability threshold. In some embodiments, the probability threshold can be set to 0.4.

Method 600 can further comprise an activity 640 of identifying the tokens that satisfy the probability threshold. In some embodiments, the total number of tokens that satisfy the probability threshold may additionally be compared to a maximum token threshold as described above.

Method 600 can further comprise an activity 650 of utilizing the tokens that satisfy the probability threshold to identify the search results.

As evidenced by the disclosure herein, the techniques set forth in this disclosure are rooted in computer technologies that overcome existing problems in known search engines, including problems associated with identifying search results in scenarios where search queries include unimportant or extraneous tokens. The techniques described in this disclosure provide a technical solution (e.g., one that utilizes various machine learning techniques) for overcoming the limitations associated with known techniques. Amongst other things, this technology solution leverages machine learning to understand the importance of tokens included in search queries.

In certain embodiments, the techniques described herein can advantageously improve user experiences with electronic platforms by presenting search results with improved recall and precision. In various embodiments, the techniques described herein can be executed dynamically in real time by an electronic platform. In many embodiments, the techniques described herein can be used continuously at a scale that cannot be reasonably performed using manual techniques or the human mind (e.g., due to processing large numbers of training event samples, and performing other complex operations executed by the machine learning architecture). The data analyzed by the machine learning techniques described herein can be too large to be analyzed using manual techniques.

Furthermore, in a number of embodiments, the techniques described herein can solve a technical problem that arises only within the realm of computer networks, because machine learning does not exist outside the realm of computer networks.

Although systems and methods have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 6 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions, that when executed on the one or more processors, cause the one or more processors to execute operations comprising:
      receiving, at a search engine, a search query comprising tokens;
      determining, using a weight determination model of a machine learning architecture, token weights for the tokens included in the search query, wherein each token weight predicts a probability that a corresponding token will match metadata of a positively engaged item included in search results that are presented in response to the search query, wherein the weight determination model is configured to identify extraneous tokens based on at least the token weights or the metadata, wherein the metadata comprises at least one of names, titles, or keywords associated with items of a catalog, and wherein the positively engaged item comprises an item in a set of items that was at least one of selected, viewed, ordered, purchased, or added to a cart by a user who submitted a previous search query;
      comparing the token weights associated with the tokens to a probability threshold;
      segregating the extraneous tokens based on at least the token weights or the metadata;

identifying the tokens that satisfy the probability threshold; and utilizing the tokens that satisfy the probability threshold to identify the search results.

2. The system of claim 1, wherein the tokens that do not satisfy the probability threshold comprise negatively engaged items that are not utilized to identify the search results.

3. The system of claim 1,
wherein:
the weight determination model is trained using historical search data to generate the token weights for the tokens; and
the weight determination model eliminates the extraneous tokens in the search query based on the token weights.

4. The system of claim 1, wherein the weight determination model comprises:
(a) a language processing model configured to:
receive the tokens included with the search query; and
generate token vectors based on the tokens;
(b) a sequence model that is configured to:
receive the token vectors from the language processing model; and
generate token weight vectors corresponding to the token weights for the tokens;
and
(c) a classification layer that is configured to:
receive the token weight vectors from the sequence model; and
map the token weight vectors to probability values representing the token weights.

5. The system of claim 1, wherein:
the search engine is configured to identify a recall set of search results; and
the tokens that satisfy the probability threshold are utilized to identify the recall set of search results.

6. The system of claim 1, wherein the computing instructions, when executed on the one or more processors, further cause the one or more processors to execute operations comprising:
determining a number of the tokens that satisfy the probability threshold; and
comparing the number of the tokens that satisfy the probability threshold to a maximum token threshold, wherein the maximum token threshold indicates a maximum number of the tokens that can be utilized to identify the search results.

7. The system of claim 6, wherein:
in response to determining that the number of the tokens that satisfy the probability threshold exceeds the maximum token threshold, selecting a subset of the tokens that satisfy the probability threshold to identify the search results; and
the subset of the tokens is selected based on the token weights.

8. The system of claim 1, wherein:
the weight determination model comprises a sequence model;
the sequence model is trained using training samples that are derived from historical search data; and
the training samples comprise previous search queries submitted for positively engaged items.

9. The system of claim 8, wherein:
each of the previous search queries comprises one or more tokens;
each of the one or more tokens are assigned a label; and
the label indicates whether the corresponding token matched the metadata of a corresponding positively engaged item.

10. The system of claim 8, wherein:
the training samples enable the sequence model to assign the token weights to the tokens based on a context in which the tokens are used in a given search query, such that an identical token used in both a first search query and a second search query is assigned different token weights based on the context.

11. A method implemented via execution of computing instructions configured to run at one or more processors and stored on non-transitory computer-readable media, the method comprising:
receiving, at a search engine, a search query comprising tokens;
determining, using a weight determination model of a machine learning architecture, token weights for the tokens included in the search query, wherein each token weight predicts a probability that a corresponding token will match metadata of a positively engaged item included in search results that are presented in response to the search query, wherein the weight determination model is configured to identify extraneous tokens based on at least the token weights or the metadata, wherein the metadata comprises at least one of names, titles, or keywords associated with items of a catalog, and wherein the positively engaged item comprises an item in a set of items that was at least one of selected, viewed, ordered, purchased, or added to a cart by a user who submitted a previous search query;
comparing the token weights associated with the tokens to a probability threshold;
segregating the extraneous tokens based on at least the token weights or the metadata;
identifying the tokens that satisfy the probability threshold; and
utilizing the tokens that satisfy the probability threshold to identify the search results.

12. The method of claim 11, wherein the tokens that do not satisfy the probability threshold comprise negatively engaged items that are not utilized to identify the search results.

13. The method of claim 1,
wherein:
the weight determination model is trained using historical search data to generate the token weights for the tokens; and
the weight determination model eliminates the extraneous tokens in the search query based on the token weights.

14. The method of claim 11, wherein the weight determination model comprises:
(a) a language processing model configured to:
receive the tokens included with the search query; and
generate token vectors based on the tokens;
(b) a sequence model that is configured to:
receive the token vectors from the language processing model; and
generate token weight vectors corresponding to the token weights for the tokens;
and
(c) a classification layer that is configured to:
receive the token weight vectors from the sequence model; and
map the token weight vectors to probability values representing the token weights.

15. The method of claim 11, wherein:
the search engine is configured to identify a recall set of search results; and
the tokens that satisfy the probability threshold are utilized to identify the recall set of search results.

16. The method of claim 11 further comprising:
determining a number of the tokens that satisfy the probability threshold; and
comparing the number of the tokens that satisfy the probability threshold to a maximum token threshold, wherein the maximum token threshold indicates a maximum number of the tokens that can be utilized to identify the search results.

17. The method of claim 16, wherein:
in response to determining that the number of the tokens that satisfy the probability threshold exceeds the maximum token threshold, selecting a subset of the tokens that satisfy the probability threshold to identify the search results; and
the subset of the tokens is selected based on the token weights.

18. The method of claim 11, wherein:
the weight determination model comprises a sequence model;
the sequence model is trained using training samples that are derived from historical search data; and
the training samples comprise previous search queries submitted for positively engaged items.

19. The method of claim 18, wherein:
each of the previous search queries comprises one or more tokens;
each of the one or more tokens are assigned a label; and
the label indicates whether the corresponding token matched the metadata of a corresponding positively engaged item.

20. The method of claim 18, wherein:
the training samples enable the sequence model to assign the token weights to the tokens based on a context in which the tokens are used in a given search query, such that an identical token used in both a first search query and a second search query is assigned different token weights based on the context.

* * * * *